(12) United States Patent
Wolfschaffner

(10) Patent No.: US 7,175,048 B2
(45) Date of Patent: Feb. 13, 2007

(54) METHOD AND DEVICE FOR GRAVIMETRIC DOSING BULK MATERIAL

(75) Inventor: Hubert Wolfschaffner, Dasing (DE)

(73) Assignee: Pfister GmbH, Augsburg (DE)

( * ) Notice: Subject to any disclaimer, the term of this patent is extended or adjusted under 35 U.S.C. 154(b) by 0 days.

(21) Appl. No.: 10/494,386

(22) PCT Filed: Nov. 4, 2002

(86) PCT No.: PCT/EP02/12261

§ 371 (c)(1),
(2), (4) Date: Dec. 22, 2004

(87) PCT Pub. No.: WO03/040666

PCT Pub. Date: May 15, 2003

(65) Prior Publication Data

US 2005/0145420 A1    Jul. 7, 2005

(30) Foreign Application Priority Data

Nov. 3, 2001    (DE) .............................. 101 53 425

(51) Int. Cl.
*G01G 13/00*    (2006.01)

(52) U.S. Cl. .............................. 222/77; 222/1; 222/58; 222/64; 222/185.1

(58) Field of Classification Search ................... 222/64, 222/58, 77, 236, 226, 367, 368, 453, 450, 222/185.1, 1

See application file for complete search history.

(56) References Cited

U.S. PATENT DOCUMENTS

| | | | | |
|---|---|---|---|---|
| 3,228,563 A | * | 1/1966 | Rankin et al. | 222/77 |
| 3,677,540 A | * | 7/1972 | Weiss | 222/23 |
| 4,071,166 A | * | 1/1978 | Legille et al. | 222/1 |
| 4,180,185 A | * | 12/1979 | Yamamoto et al. | 222/57 |
| 4,427,133 A | * | 1/1984 | Kierbow et al. | 222/77 |
| 4,669,634 A | * | 6/1987 | Leroux | 222/53 |
| 4,728,240 A | * | 3/1988 | Mahr et al. | 414/21 |
| 5,450,984 A | * | 9/1995 | Rohr | 222/56 |
| 5,489,166 A | * | 2/1996 | Schmit | 406/137 |

FOREIGN PATENT DOCUMENTS

| | | |
|---|---|---|
| DE | 33 10 735 A | 9/1984 |
| DE | 34 13 757 A | 10/1985 |
| FR | 2 631 443 A | 11/1989 |

* cited by examiner

Primary Examiner—Frederick C. Nicolas
(74) Attorney, Agent, or Firm—Knobbe Martens Olson & Bear, LLP

(57) ABSTRACT

In order to increase the dosing accuracy of a dosing device, the bulk material is temporarily stored upstream from a reservoir (1) in an intermediate storage container (6) and is transferred only when a compensating pressure value is reached. The invention also relates to a corresponding device with a valve lock (4,5) on the intermediate container (6).

7 Claims, 1 Drawing Sheet

METHOD AND DEVICE FOR GRAVIMETRIC DOSING BULK MATERIAL

DESCRIPTION

Figure 1:
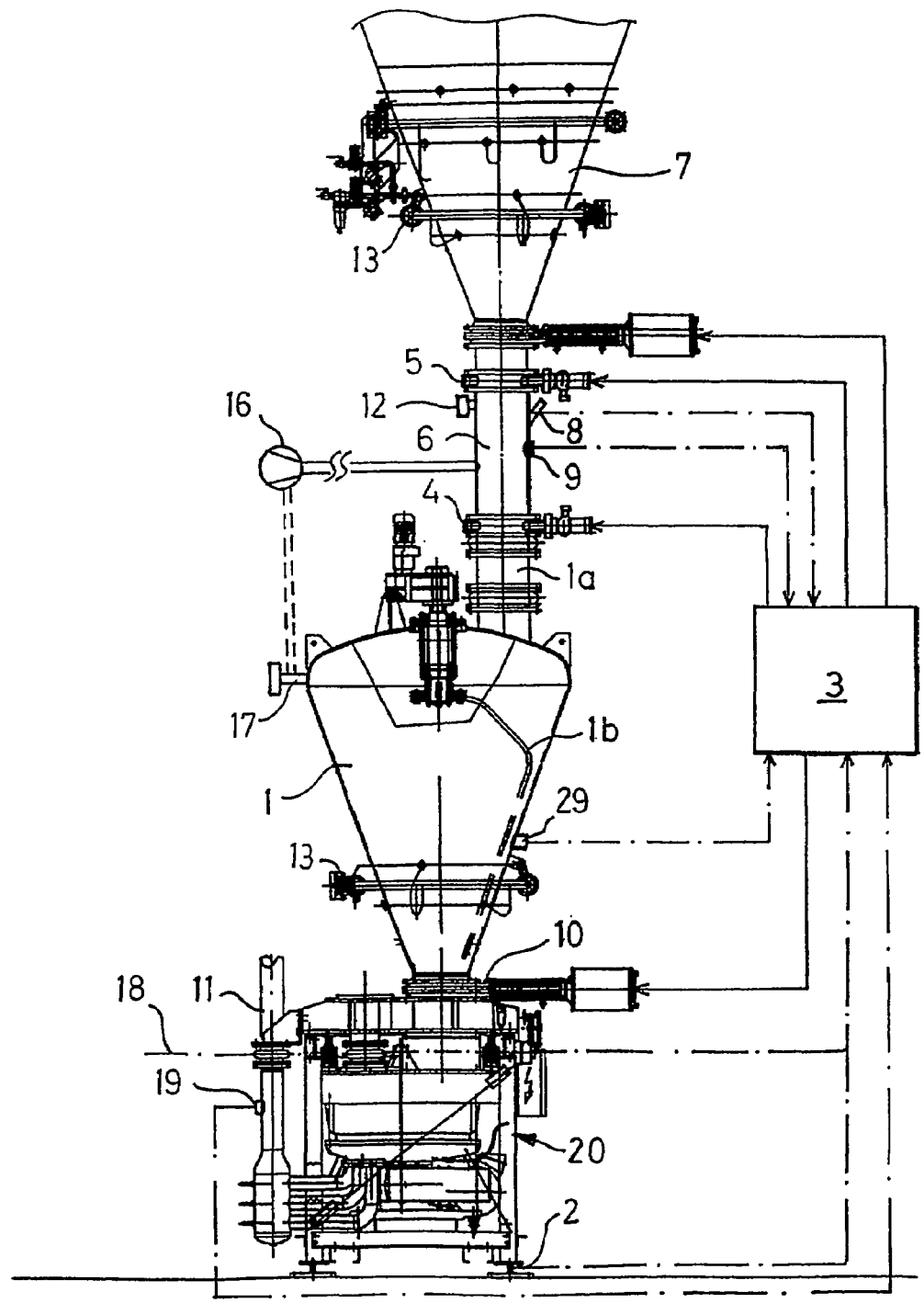

The invention relates to a method and an apparatus for gravimetric dosing bulk material with the preamble features of claims 1 and 8, respectively.

Such a method and an apparatus for charging a container with a powdery material is known from DE 34 13 757 A1. In this case, at least one feeding pipe opens into a reservoir, through which the powdery bulk material is successively drawn from one or several storage containers, is weighed in an additive manner there and, after the opening of a floor lock, is supplied to a mixing device. Such mixing units for dosing batches of powdery goods are used in the ceramics industry for example, with several assortments of different bonding agents, fillers, dyes and additives being weighed. The bulk materials are supplied to the weighing container via conveying worms or a pneumatic conveyor stream. The weighing precision substantially depends on the pressure conditions in such weighing apparatuses which are situated in a pneumatic conveyor stream. For a sufficient weighing precision, pressure surges occurring in the conveyor stream, through the actuation of valves for example, that affect the weighing machine must be prevented. Frequently, the entering and exiting conduits for charging and discharging are guided in a horizontal manner in the connection region so that changes in pressure will not exert any influence on the weighing cell. These measures are insufficient to exclude any influence of the pressure conditions on the weighing signal, so that the weighing results can be altered even in the case of low pressure differences or undefined leakage air quantities.

An adjusting method for a weighing container is known from DE 33 10 735 A1, with the effect of power shunts on the weighing result being minimized in such a way that from the apparent change in load or weight of the weighing container a corrective variable is determined based on the temperature or pressure which is then superimposed on the weighing signal by addition or subtraction. Since a direct influence is made on the weighing signal, the ability to calibrate such a system is not given.

From EP-B-0 644 406 of the applicant, the arrangement of a pressure sensor for measuring the pressure in the weighing container is known which allows detecting the respectively prevailing pressure conditions in the weighing container. The weighing signal of the weighing cells will be accepted by the electronic weighing system for registration only on reaching or falling below a certain threshold pressure value. This prevents that a weighing will occur under an excessive negative or excess pressure which could alter the weighing results of the calibrated weighing cell and electronic weighing system. The registration of the weighing results and the forward switching to the next dosing step does not occur until the pressure in the weighing container substantially corresponds to the ambient pressure. This system is hardly suitable for the pneumatic discharge, especially in the case of low conveying streams with respectively low air quantities.

The invention is therefore based on the object of providing a method for the gravimetric dosing of bulk material and a respective apparatus, with a higher weighing precision being achieved, especially at small conveying streams.

This object is achieved by a method with the features of claim 1 and by an apparatus with the features of claim 8.

In accordance with an embodiment according to the invention, an intermediate container with a valve lock upstream of the weighing container or reservoir for the gravimetric dosing apparatus is used to control in a purposeful manner the bulk material supply and the charging of the reservoir. This ensures that no leakage air can escape from the pneumatic conveyor system, especially during the start of the dosing process. This compensation of the actions of force by the conduits charging and discharging the gravimetric dosing apparatus lead to an overall more precise dosing.

Further advantageous embodiments are the subject matter of the subclaims.

An embodiment is described and explained in closer detail by reference to the enclosed drawing. The (only) FIG. 1 shows an embodiment of a container weighing machine, with a reservoir 1 of a gravimetric dosing apparatus 20 being supported through at least one weighing cell 2 which is arranged in this case below a frame. The output of the weighing cell 2 is connected with an electronic weighing system 3 with an integrated dosing control (cf. dot-dash arrow) which registers, processes and displays in a control computer the weight of the reservoir 1 and the weight running through the dosing apparatus 20. The dosing control unit also activates a lower flap 4 in a feed pipe 1 a which converges into a tubular intermediate container 6 which is connected with a storage container (silo) situated above the same. A slide not designated in closer detail and an upper flap 5 are arranged below the storage container 7 which can both be actuated by the electronic weighing system 3 or the dosing control unit. The intermediate container 6 with the flaps that can be actuated in an alternating manner thus form a so-called valve lock.

A discharge flap 10 or stop slide valve is provided below the storage container 1, which flap or slide valve is also activated by the dosing control unit and is connected to a gravimetric dosing apparatus 20 with pneumatic discharge, especially a dosing rotor weighing machine. The reservoir 1 of the dosing rotor weighing machine 20 is thus filled by a valve lock which is formed by the two flaps 4 and 5 and the intermediate container 6 and works as follows:

At first the upper flap 5 of the intermediate container 6 opens. Bulk material such as coke dust flows from the silo 7 (when the upper slide is opened) to the intermediate container 6 which is situated between the upper flap 5 and the lower flap 4. In exchange thereto, the displaced air is guided into the silo 7. The upper filling flap 5 closes over time or by the signal of a filling probe of the intermediate container 6. The pressure in the coke-filled intermediate container 6 is detected by a pressure sensor 9 and the pressure signal is guided to the electronic weighing system 3, so that the pressure is brought by means of a pressure control device integrated in the electronic weighing system 3 to a pressure of the reservoir 1 at or slightly over the pressure as measured by the pressure sensor 29 by supplying compressed air via a pump 16, which pressure is obtained especially by leakage air from a pneumatic conveyor line 11 when the dosing apparatus 20 is emptied. The lower flap 4 then opens following a command given by the electronic weighing system 3. The coke dust is thus discharged through the filling pipe 1a into the reservoir 1 situated beneath the same. The lower flap 4 on the intermediate container 6 closes again after a short period of time or after the empty report of the filling level probe 8. The air pressure in the intermediate container 6 as transmitted by the reservoir 1 is then relieved optionally by opening a relief valve 12. This cycle is repeated in time-varying intervals, according to the follow-up flow behavior of the material and the demanded dosing output of the dosing rotor weighing machine 20 and the filling level requirements as determined from the respective weight of the reservoir 1.

The coke dust then flows continuously from the reservoir 1 to the cell wheel of the dosing rotor weighing machine 20. As already indicated above, the cell wheel or dosing rotor can swivel about axis 18 by resting on or suspended from the weighing cell 2 and thus supplies a weighing signal. Like the storage container 7, the reservoir 1 optionally comprises a ventilation device 13 for fluidizing the coke dust. For the additional support of the material flow, a motor-driven, continually operating stirrer arm 1b is installed in the reservoir 1. The filling level in the reservoir 1 is thus gravimetrically detected by the measuring device and its filing is regulated accordingly by triggering the valve lock 4, 5.

As stated above, it is relevant to provide a pressure sensor 9 on the intermediate container 6 in order to detect the pressure prevailing in the same and to balance the same with the pressure in the reservoir 1 as detected via the pressure sensor 29. The pressure sensor 9 like the pressure sensor 29 is connected to the electronic weighing system 3, in which a specific threshold pressure value is determined and, depending on the demanded precision, is saved as a set-point value, preferably a pressure difference of close to zero. Only when the pressure sensor 9 of the intermediate container 6 detects a pressure in comparison with the pressure value of the pressure sensor 29 on the reservoir 1 which corresponds to this compensation or limit differential pressure value preferably close to zero, will the electronic weighing system 3 emit the signal to open the lower flap 4 and thus the dosing of a further batch is initiated into the reservoir 1 which is thus close to the same pressure level.

Moreover, a further pressure sensor 19 can detect the pressure conditions in the pneumatic discharge apparatus 11 in order to mutually adjust the pressure signals with those of pressure sensors 9 and 19 in the electronic weighing system 3. Since a relatively high pressure can be achieved in the intermediate container 6 in charging with powdery bulk materials even in the case of low volume flows, it is appropriate to provide there at least one venting apparatus 12 for the purpose of quicker pressure reduction, so that the desired limit pressure value and in particular the complete pressure balancing is achieved as rapidly as possible. A filter is used for example as a venting apparatus 12 in order to prevent any escape of powdery material. A similar pressure relief apparatus 17 is also provided on the reservoir 1 in order to achieve a pressure reduction there too for adjustment to the pressure in the intermediate container. Conversely, there can also be a pressurization of the containers 1 and 6 through the compressed air pump 16 in order to achieve a pressure balancing or adjustment prior to the opening of the lower flap 4.

In this embodiment with pneumatic conveyor apparatus 11, leakage air and wrong flows with falsifications of the weighing results can no longer occur as a result of the compensation of the pressure conditions in the reservoir 1 and the intermediate container 6 with valve lock 4, 5 via the discharge apparatus. As a result of the pressure measurement with the pressure sensors 9 and 29 or 19, the conveyance of the bulk material of the dosing rotor weighing machine 20 can be optimized. If there is an excess pressure in the reservoir 1, the intermediate container 6 can be pressurized through the compressed air pump, thus leading to a pressure adjustment relative to the reservoir 1. This adjustment of the pressure conditions in the intermediate container 6 and in the reservoir 1 allows increasing the dosing precision by avoiding wrong flows and return flows of particles in the dosing apparatus 20.

The opposite situation occurs analogously in a negative pressure in the reservoir 1. A negative pressure in the reservoir 1 can occur for example when the discharge apparatus 11 is configured as a suction apparatus. A pressure compensation by venting or pressurizing the reservoir 1 or the intermediate container 6 can be achieved before the opening of the lower flap 4 occurs for forwarding the bulk material.

The invention claimed is:

1. A method for gravimetric dosing of bulk material which is supplied from a storage container to a reservoir, is weighed there by determining a weighing signal for forwarding to an electronic weighing system and is discharged from the reservoir to a gravimetric dosing apparatus, wherein the bulk material is intermediately stored in an intermediate container prior to being weighed in the reservoir and is only released from the intermediate container upon reaching a compensation pressure value, and wherein a pressure in the intermediate container and in the reservoir is measured continually, and wherein a pneumatic charging/discharging of the bulk material with negative or excess pressure, a pressure in a conveying conduit is measured in addition and is compared with the pressure in the intermediate container for determining the compensation pressure value.

2. A method as claimed in claim 1, wherein the intermediate container and/or the reservoir is vented from a certain pressure increase rate.

3. A method as claimed in claim 1, wherein the compensation pressure value is fixed to a pressure difference of approximately zero.

4. A method as claimed in claim 1, wherein the pressure measured in the intermediate container and/or the reservoir, and their differential pressure value, is guided to a dosing control unit or electronic weighing system for the purpose of controlling a dosing apparatus.

5. A method as claimed in claim 4, wherein the intermediate container and/or reservoir can be pressurized by a pump.

6. An apparatus for gravimetric dosing bulk material with a reservoir which rests on at least one weighing cell connected to an electronic weighing system and is connected via flexible connections with a bulk material supply line and a gravimetric dosing apparatus, wherein a valve lock is formed by an upper flap and a lower flap at an intermediate container arranged upstream of the reservoir, and wherein a pressure sensor is provided each in the intermediate container and in the reservoir for detecting a pressure in the intermediate container and in the reservoir and means for measuring a pressure in a conveying conduit, wherein a pneumatic charging/discharging of the bulk material with negative or excess pressure, the pressure in the conveying conduit is compared with the pressure in the intermediate container for determining a compensation pressure value.

7. An apparatus as claimed in claim 6, wherein at least one filling level probe is provided on the intermediate container.

* * * * *